July 15, 1952 — E. DEL BUTTERO — 2,603,740
CONTAINER
Filed Aug. 13, 1946 — 2 SHEETS—SHEET 1
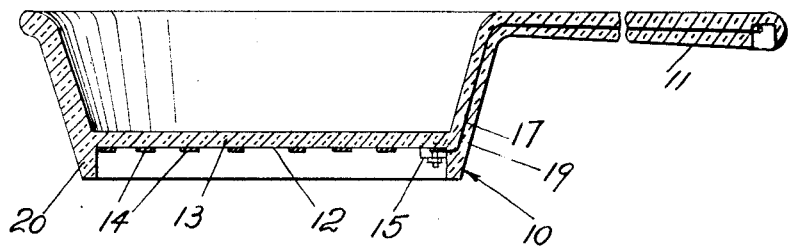
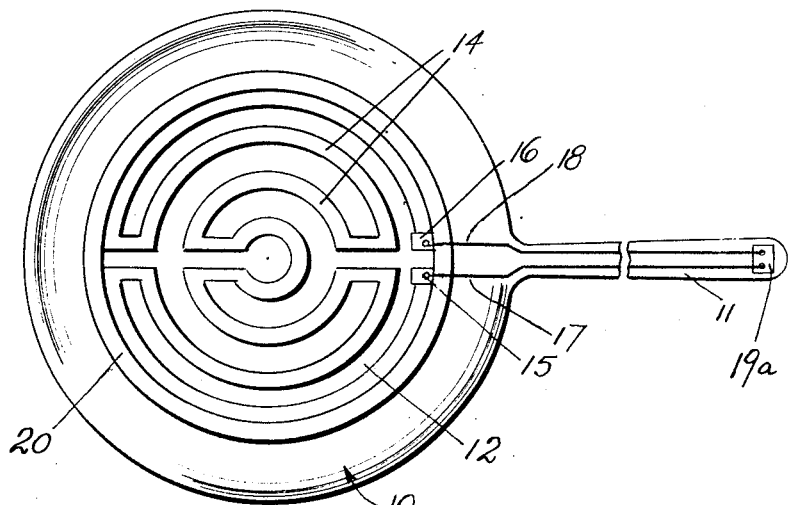
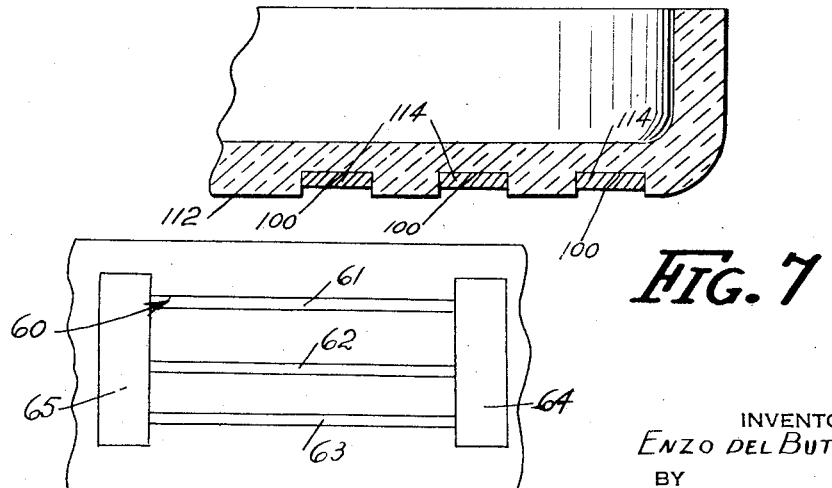
INVENTOR
ENZO DEL BUTTERO
BY
Richards & Geier
ATTORNEYS July 15, 1952  E. DEL BUTTERO  2,603,740
CONTAINER
Filed Aug. 13, 1946  2 SHEETS—SHEET 2
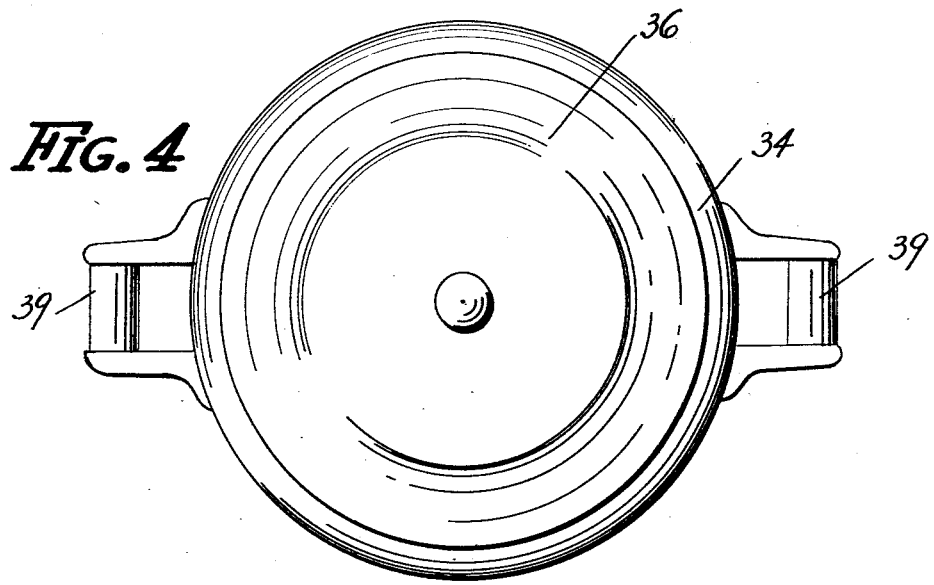
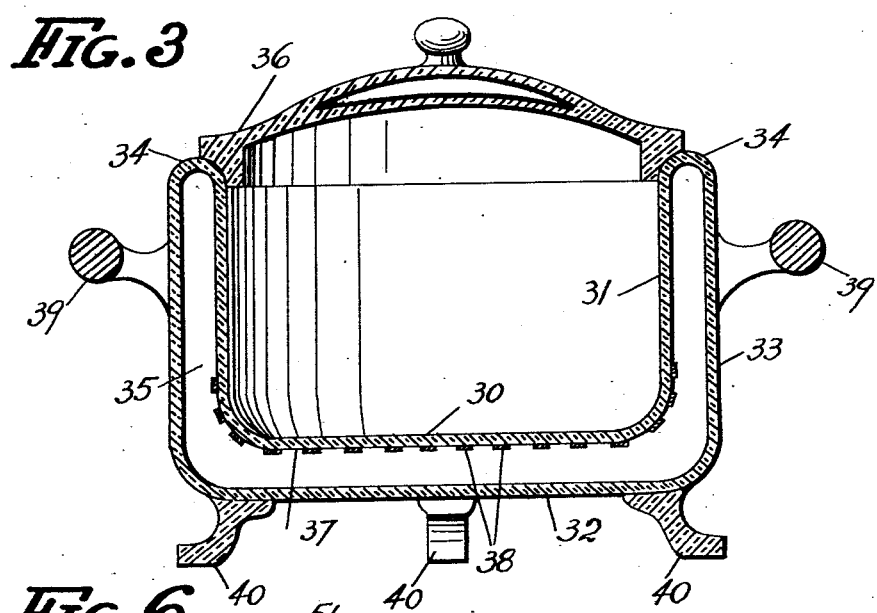
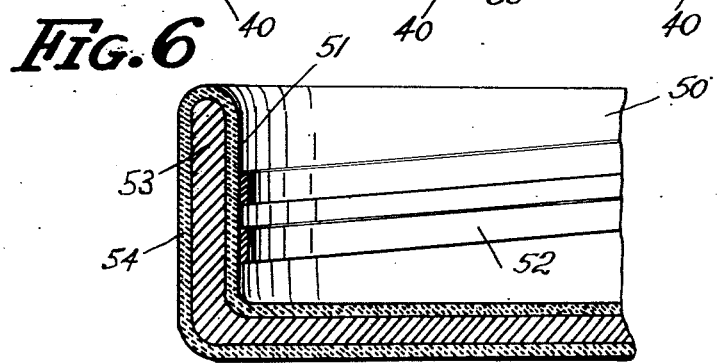
INVENTOR
*Enzo del Buttero*
BY
*Richards & Geier*
ATTORNEYS Patented July 15, 1952

2,603,740

UNITED STATES PATENT OFFICE 2,603,740

CONTAINER

Enzo Del Buttero, Milan, Italy, assignor to Manufactures des Glaces et Produits Chimiques de St. Gobain, Chauny & Cirey, Paris, France, a corporation of France Application August 13, 1946, Serial No. 690,104
In Italy August 13, 1945

3 Claims. (Cl. 219—44)

This invention relates to the containers and refers more particularly to electrically heated containers adapted for use in the kitchen, on the dining table, or as various devices for chemical laboratory use, industrial use, and the like, the electrical heating being carried out by means of resistances constituted by metallic layers deposited upon the containers.

An object of the present invention is the provision of suitable properly functioning electrical heating means for various utensils and containers for kitchen use, which are made of porcelain, clay, stoneware, earthenware, specially prepared glass or similar heat-resistant substances, particularly such ornamentally designed containers or serving dishes which can be brought directly from the kitchen to the dining room table, thereby avoiding the inevitable loss of heat which takes place when contents must be poured from one container to another.

It is known that kitchen utensils and containers are very poorly adapted for use in conjunction with electrical furnaces, either because the more or less curved bottom of such containers made of earthenware, porcelain, stoneware, and the like, does not receive well the heat transmitted by the heating plate of the electrical furnace, or since the coefficient of heat conductivity of these materials is much smaller than that of metal, particularly of copper and aluminum which are generally used for the manufacture of kitchen utensils. It is, therefore, another object of the present invention to adapt containers or utensils suitable for the dining table to being heated by an electrical current.

As already stated, the present invention also refers to containers and devices which are used in chemical laboratories and industry, and which are made of clay, terra cotta, earthenware, sandstone, fibro-cement, and the like, and which serve as receptacles for substances to be heated. It was found rather difficult to supply heat to such receptacles, particularly if only a part of the receptacles is to be heated, and it is, therefore, a further object of the present invention to provide such receptacles with suitable electrical heating means which will make it possible to heat effectively the contents of the receptacles.

Still another object of the present invention is to eliminate at least some of the above described drawbacks and to adapt kitchen utensils and serving dishes of glass, earthenware, porcelain, and the like, as well as containers for industrial purposes, to the use of electricity as a heating agent.

Other objects of the present invention will become apparent in the course of the following specification.

In realizing the objects of the present invention it was found advisable to deposit by any suitable means a metallic layer in the form of a strip or band upon the surface to be heated, namely, upon the bottom of the container and/or upon its walls or sides. The width, the length, and the thickness of the strip depend upon the heat effect which is desired. The electrical resistance of the strip is further determined by the nature and the density of the metal constituting the resistance.

In accordance with one of the preferred embodiments of the invention, the containers may be made of ordinary glass, which may be tempered if desired, and the metallic layer may be deposited by any suitable means, for instance, those described in the United States Letters Patent No. 2,119,680 of June 7, 1938.

A perfectly uniform distribution of the heat may be obtained by suitably distributing the electrical heating band over the surface to be heated.

According to another embodiment of the inventive idea, which is given by way of example only, the container to be heated may be made of special glass having a small coefficient of expansion, or being resistant to substantial heat variations, either due to its special composition, such as a boric base, or due to large percentage of aluminum or other suitable ingredients contained therein, or due to the fact that it was subjected to special thermic treatments, such as tempering.

If the contents of the receptacle have small electrical conductivity, such as oil for example, then the metal strip constituting the heating resistance may be deposited upon the inner surface of the receptacle in direct contact with the substance to be heated, thereby attaining the best possible conditions for an exchange of heat.

In most cases, however, the strip constituting the heating resistance is placed upon an outer surface of the receptacle and is deposited either directly upon such surfaces, or upon the bottom of grooves or depressions which are formed therein for the purpose of providing some protection from damage to the resistance.

It is also possible to protect the bottom and/or the side walls to be heated by means of projections or supports made of the same or different materials, or by means of a false bottom and/or false side walls. The spaces formed by the false bottom or walls may be evacuated to diminish heat losses.

In accordance with a further modification of the present invention, the metallic layer which acts as the electrical resistance can be deposited upon the enamel of utensils made of iron or other metal, or upon oxidized surfaces of containers made of aluminum. Since the enamel, as well as the layer of oxidation of aluminum or its alloys are electrical insulators, the strip of resistance will operate in the same manner as if it were deposited upon glass.

Obviously, the described resistance must have the shape of a continuous strip and must have ends which are connected to electrical contacts. On the other hand, the form of the band and the manner of arranging it upon the surface to be heated may vary, provided that the ends are attached to two terminals, which are preferably arranged one next to the other, so that they can be connected to the same current-transmitting plug. The terminals are preferably located close to a side wall or in a recess of the receptacle, in order to cover or protect them as much as possible.

Obviously, any suitable number of strips constituting heating resistances may be applied upon a container and one or more of such strips may be used independently of other strips; the strips may be inter-connected in series or in parallel to provide variations in the extent of the electrical heating. Furthermore, it is possible to use triphase current and to provide three band segments constituting the heating resistance, which may be interconnected in triangle or in star.

The invention will appear more clearly from the following detailed description when taken in connection with the accompanying drawings showing, by way of example, preferred embodiments of the inventive idea.

In the drawings:

Figure 1 is a section through a glass pan constructed in accordance with the principles of the present invention.

Figure 2 is a bottom view of the container shown in Figure 1.

Figure 3 is a section through a pot provided with double walls and constructed in accordance with the principles of the present invention.

Figure 4 is a top view of the pot shown in Figure 3.

Figure 5 is a fragmentary sectional view illustrating the location of layers constituting electrical resistances within grooves.

Figure 6 is a fragmentary sectional view illustrating the arrangement of electrical heating resistances within a container, and also illustrating the use of insulating layers as carriers of the resistances.

Figure 7 is a fragmentary sectional view illustrating diagrammatically the use of resistances composed of a plurality of segments and the interconnection of such segments.

Figures 1 and 2 of the drawings show a pan which is made of glass and which includes a round body 10 and a handle 11. The outer surface 12 of the bottom 13 of the pan carries strips 14 which consists of metal and which constitute the electrothermic heating element.

The strips 14 may be deposited directly upon the surface 12 of the pan, as shown in Figure 1 of the drawings.

On the other hand, the surface 112 of a utensil shown in Figure 5 may be provided with grooves 100 and conducting strips 114 may be located within these grooves.

The heating elements may be deposited by any suitable means, for instance, those described in United States Letters Patent No. 2,119,680 of June 7, 1938.

As shown in Figure 2, the heating strips 14 may be arranged in the form of a suitable design and may be so dispersed that they cover substantially uniformly most of the surface 12.

The strip 14 is a continuous one and has two ends which are preferably located adjacent to one another and which are connected with contacts 15 and 16, respectively. Wires 17 and 18 are connected with the contacts 15 and 16 and pass through a wall 19 of the pan and also through the handle 11. The ends of the wires 17 and 18 may terminate in a socket 12a which is partly embedded in the handle 11 and which may be connected to a current transmitting plug.

The bottom 13 of the pan may be supported by a round rib 20 and thus is protected against contact with conducting materials which may otherwise cause a short circuit in the resistance 14, and also against contact with articles which may be damaged by the heat emanating from the resistance 14.

Obviously any other suitable means such as legs 40, shown in Figure 3, may be substituted for the support 20.

The same results may be attained by the use of a container having a false bottom and/or false walls which may form an intermediate space. Figure 3 shows a pot having a double bottom and double walls. The pot consists of an inner container having a bottom 30 and side walls 31, and an outer container having a bottom 32 and side walls 33. The walls 31 and 33 are joined by strips or webs 34. The inner container and the outer container are located at a distance from each other so as to provide an inner chamber 35 which may be evacuated if desired. A cover 36 which is carried by the webs 34 may also consist of two walls. Outer surfaces 37 of the inner container carry conductors 38 which may extend over at least a part of the side walls 31, as well as over the bottom 30. The ends of the resistance 38 are connected to terminals (not shown) which may receive a plug transmitting electrical current. The outer walls 33 of the pot carry two handles 39.

It is apparent that the described utensils are most effective in heating the condiments placed therein. The pot shown in Figure 3 will preserve most efficiently heat stored within the inner container, not only during the cooking of the condiments, but thereafter as well.

Figure 6 shows a part of a receptacle 50 having an inner surface 51 which carries a heating resistance 52. This receptacle may be used for the heating of substances which are poor conductors of electricity.

The receptacle 50 has a metal base 53 carrying an insulating layer 54, and the resistance 52 is located upon the layer 54. This layer may consist of any suitable insulation, such as enamel or oxidation.

Figure 7 shows diagrammatically a resistance 60 consisting of three sections 61, 62 and 63. Any suitable switches 64 and 65 may be employed to use separately at least some of these sections, or to interconnect them in series or in parallel. In case of a triphase current, the switches 64 and 65 may be used to interconnect the sections in triangle or in star. These arrangements make it possible to vary conveniently the intensity of the heating.

It is apparent that the examples shown above have been given by way of illustration and not by way of limitation and that these examples are subject to wide variation or modification without departing from the scope or intent of the present invention. All of such variations and modifications are to be included within the scope of the present invention.

What is claimed is:

1. As an article of manufacture, a container for kitchen, table, laboratory and industrial use, said container having insulating bottom and side surfaces of tempered glass, at least a part of said surfaces having grooves formed therein and an electrical heating resistance having the form of a continuous metallic strip consisting of a thin, adherent, conglomerated and solidified deposit of finely divided molten metal particles, and located in the bottom of said grooves.

2. As an article of manufacture, a container for kitchen, table, laboratory and industrial use, said container having insulating bottom and side surfaces of tempered glass, at least a part of said surfaces having grooves formed therein and an electrical heating resistance having the form of a continuous metallic strip consisting of a thin, adherent, conglomerated and solidified deposit of finely divided molten metal particles, and located in the bottom of said grooves, said metallic strip forming by its contact with the glass surface of the bottom of said grooves a reflecting surface, directed towards the inside of said container.

3. As an article of manufacture, a glass container for kitchen, table, laboratory and industrial use, said container having insulating bottom and side surfaces of glass, at least a part of said surfaces having grooves formed therein and an electrical heating resistance having the form of a continuous metallic strip consisting of a metallic deposit and located in the bottom of said grooves, said metallic strip forming by its contact with the glass surface of the bottom of said grooves a reflecting surface, directed towards the inside of said container.

ENZO DEL BUTTERO.

REFERENCES CITED

The following references are of record in the file of this patent:

UNITED STATES PATENTS

| Number | Name | Date |
| --- | --- | --- |
| 1,978,089 | Jones | Oct. 23, 1934 |
| 2,119,680 | Long | June 7, 1938 |
| 2,441,960 | Eisler | May 25, 1948 |
| 2,446,712 | McIlvaine | Aug. 10, 1948 |
| 2,546,983 | Del Buttero | Apr. 3, 1951 |

FOREIGN PATENTS

| Number | Country | Date |
| --- | --- | --- |
| 570,877 | Great Britain | July 26, 1945 |